(12) United States Patent
Kim et al.

(10) Patent No.: US 11,556,623 B2
(45) Date of Patent: Jan. 17, 2023

(54) ARTIFICIAL INTELLIGENCE APPARATUS AND METHOD FOR CONTROLLING AUTHORITY TO USE EXTERNAL DEVICE BASED ON USER IDENTIFICATION USING IMAGE RECOGNITION

(71) Applicant: LG ELECTRONICS INC., Seoul (KR)

(72) Inventors: Bosang Kim, Seoul (KR); Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 558 days.

(21) Appl. No.: 16/657,642

(22) Filed: Oct. 18, 2019

(65) Prior Publication Data

US 2020/0050746 A1    Feb. 13, 2020

(30) Foreign Application Priority Data

Sep. 10, 2019   (KR) .......................... 10-2019-0112241

(51) Int. Cl.
*G06F 21/32*        (2013.01)
*G06N 5/02*         (2006.01)
*G06V 40/16*        (2022.01)

(52) U.S. Cl.
CPC .............. *G06F 21/32* (2013.01); *G06N 5/02* (2013.01); *G06V 40/172* (2022.01)

(58) Field of Classification Search
CPC .......... G06F 21/32; G06N 3/08; G06N 3/008; G07C 9/00563
See application file for complete search history.

(56) References Cited

U.S. PATENT DOCUMENTS

| | | | | |
|---|---|---|---|---|
| 2010/0321151 A1* | 12/2010 | Matsuura | ................ | G06F 21/32 |
| | | | | 707/769 |
| 2014/0282648 A1* | 9/2014 | Chiu | .................... | H04N 21/458 |
| | | | | 725/12 |
| 2016/0195856 A1* | 7/2016 | Spero | ................... | H05B 47/155 |
| | | | | 700/90 |

* cited by examiner

*Primary Examiner* — Ellen Tran
(74) *Attorney, Agent, or Firm* — Birch, Stewart, Kolasch & Birch, LLP

(57) ABSTRACT

Disclosed herein an artificial intelligence (AI) apparatus for controlling authority to use an external device based on user identification using image recognition including a memory configured to store information on a user registered in the AI apparatus and authority information indicating whether a user is capable of use at least one external device under a predetermined condition, a communicator configured to receive a first image file obtained by photographing an environment including the at least one external device, a learning processor configured to provide the first image file to an image recognition model for specifying a face of a person included in an image file and an external device to be used by the person to specify first face information of a person included in the first image file and information on a first external device to be used by the person in the first image file, and a processor configured to control use of the first external device by the first user based on the authority, by acquiring a first user corresponding to the first face information and authority information of the first user.

20 Claims, 7 Drawing Sheets

ARTIFICIAL INTELLIGENCE APPARATUS AND METHOD FOR CONTROLLING AUTHORITY TO USE EXTERNAL DEVICE BASED ON USER IDENTIFICATION USING IMAGE RECOGNITION

CROSS-REFERENCE TO RELATED APPLICATIONS

This application claims the benefit of priority to Korean Patent Application No. 10-2019-0112241 filed in the Republic of Korea on Sep. 10, 2019, which is hereby incorporated by reference in its entirety.

BACKGROUND

The present disclosure relates to an artificial intelligence (AI) apparatus and method for controlling authority to use an external device based on user identification using image recognition. More particularly, the present disclosure relates to technology for controlling authority to use an external device by checking authority of a user identified using image information of the user who uses the external device and an environment including the external device.

Artificial intelligence, which is a field of computer engineering and information technology that study a method of enabling a computer to perform thinking, learning, and self-development that can be achieved by human intelligence, means a technology that enables a computer to follow intelligent behaviors of a human.

Further, artificial intelligence does not exist by itself, but is directly and indirectly often associated with other fields of computer science. In particular, it is recently actively attempted to introduce artificial intelligent factors into various fields of an information technology and use the factors to solve problems in the fields.

Meanwhile, a technology that recognizes and learns surrounding situations using artificial intelligence and provides information, which a user wants, in a desired type or performs operations or functions that a user wants has been actively studied.

Further, an electronic device that provides these various operations and functions may be referred to as an artificial intelligence device.

Meanwhile, it is necessary to limit authority of each person who intends to use a specific device located in a home environment or an office environment.

In particular, if there is a child as a family member, it is necessary to limit the TV watching time of the child for education. In addition, it is necessary to prevent the child from using a product which may cause fire, such as a microwave oven.

Accordingly, there is an increasing need for an artificial intelligence apparatus for controlling use of a specific device of a user by recognizing and learning a user and a surrounding situation.

SUMMARY

An object of the present disclosure is to solve the above-described problems and the other problems.

Another object of the present disclosure is to provide an artificial intelligence apparatus and method for controlling authority to use an external device based on user identification using image recognition.

Another object of the present disclosure is to provide an artificial intelligence apparatus and method for controlling authority to use an external device by checking authority of a user identified using image information of the user who uses the external device and an environment including the external device.

According to an embodiment, provided is an artificial intelligence (AI) apparatus for controlling authority to use an external device based on user identification using image recognition including a memory configured to store information on a user registered in the AI apparatus and authority information indicating whether a user is capable of use at least one external device under a predetermined condition, a communicator configured to receive a first image file obtained by photographing an environment including the at least one external device, a learning processor configured to provide the first image file to an image recognition model for specifying a face of a person included in an image file and an external device to be used by the person to specify first face information of a person included in the first image file and information on a first external device to be used by the person in the first image file, and a processor configured to control use of the first external device by the first user based on the authority, by acquiring a first user corresponding to the first face information and authority information of the first user.

In the embodiment, the processor may be configured to compare a predetermined condition previously set in the authority with a condition of a current state, and limit the use of the first external device when the condition of the current state does not match the predetermined condition.

According to an embodiment, provided is a method of controlling authority to use an external device at an artificial intelligence (AI) apparatus including storing information on a user registered in the AI apparatus and authority information indicating whether a user is capable of use at least one external device under a predetermined condition, receiving a first image file obtained by photographing an environment including the at least one external device, providing the first image file to an image recognition model for specifying a face of a person included in an image file and an external device to be used by the person to specify first face information of a person included in the first image file and information on a first external device to be used by the person in the first image file, and controlling use of the first external device by the first user based on the authority, by acquiring a first user corresponding to the first face information and authority information of the first user.

In the embodiment, the controlling of the use of the first external device may include comparing a predetermined condition previously set in the authority with a condition of a current state and limiting the use of the first external device when the condition of the current state does not match the predetermined condition.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Figure 1:
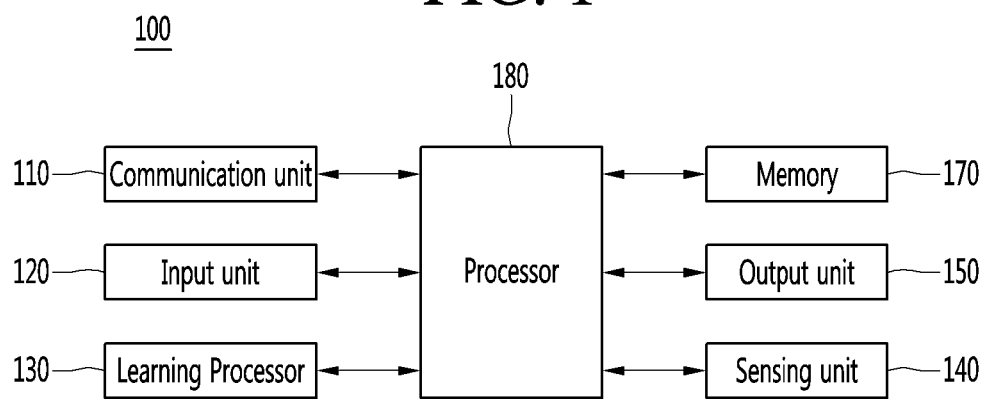
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110 (e.g., a communicator, a communication interface or transceiver), an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
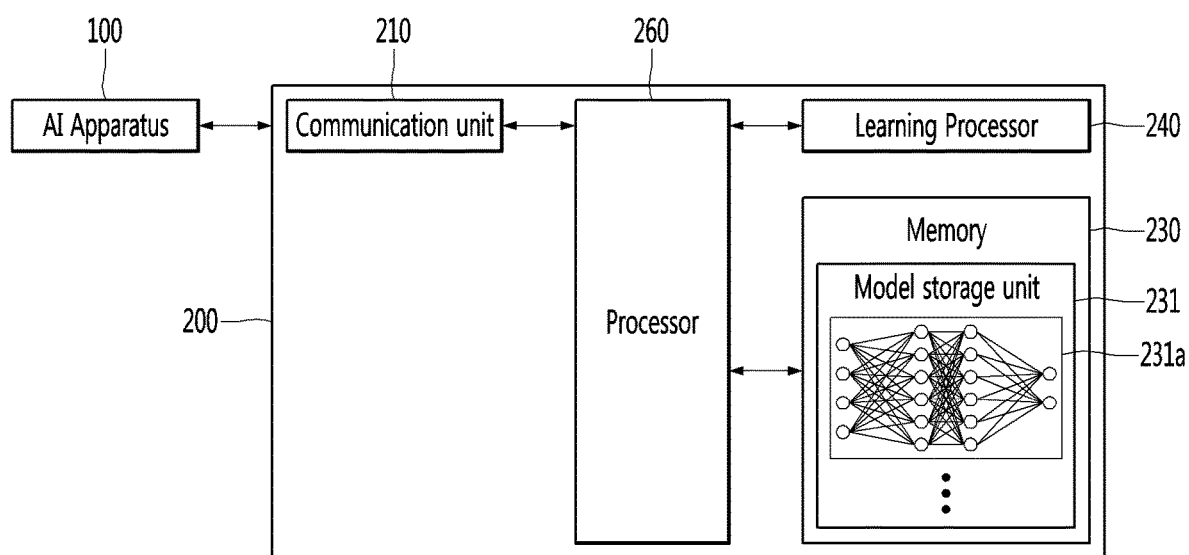
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
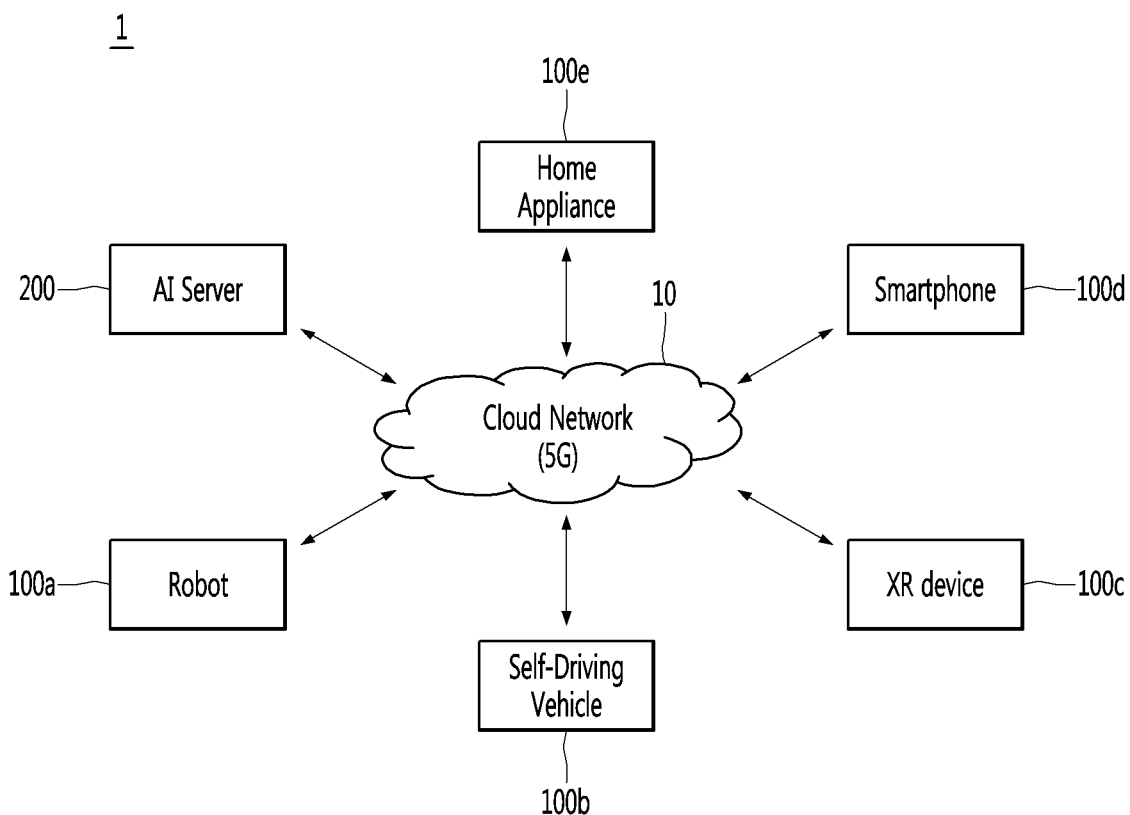
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

First, artificial intelligence (AI) will be described briefly.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values acquired through the multiplication may be summated. When the sum is greater than a threshold value of a neuron, the neuron may be activated and may output an output value acquired through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is acquired through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network has a configuration that is specified by a configuration of a model, an activation function, a loss function or a cost function, a learning algorithm, an optimization algorithm, or the like, a hyperparameter may be preset before learning, and then, a model parameter may be set through learning to specify information.

For example, a factor for determining a configuration of the artificial neural network may include the number of hidden layers, the number of hidden nodes included in each hidden layer, an input feature vector, a target feature vector, or the like.

The hyperparameter may include various parameters that need to be initially set for learning, such as an initial value of the model parameter. The model parameter may include various parameters to be determined through learning.

For example, the hyperparameter may include a weight initial value between nodes, a bias initial value between nodes, a size of mini-batch, a number of repetitions of learning, a learning rate, or the like. The model parameter may include a weight between nodes, bias between nodes, or the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use mean square error (MSE) or cross entropy error (CEE), but the present disclosure is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

In this case, the step size may refer to a learning rate.

The GD may partially differentiate the loss function with each of model parameters to acquire gradients and may change and update the model parameters by the learning rate in the acquired gradient direction.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

Figure 4:
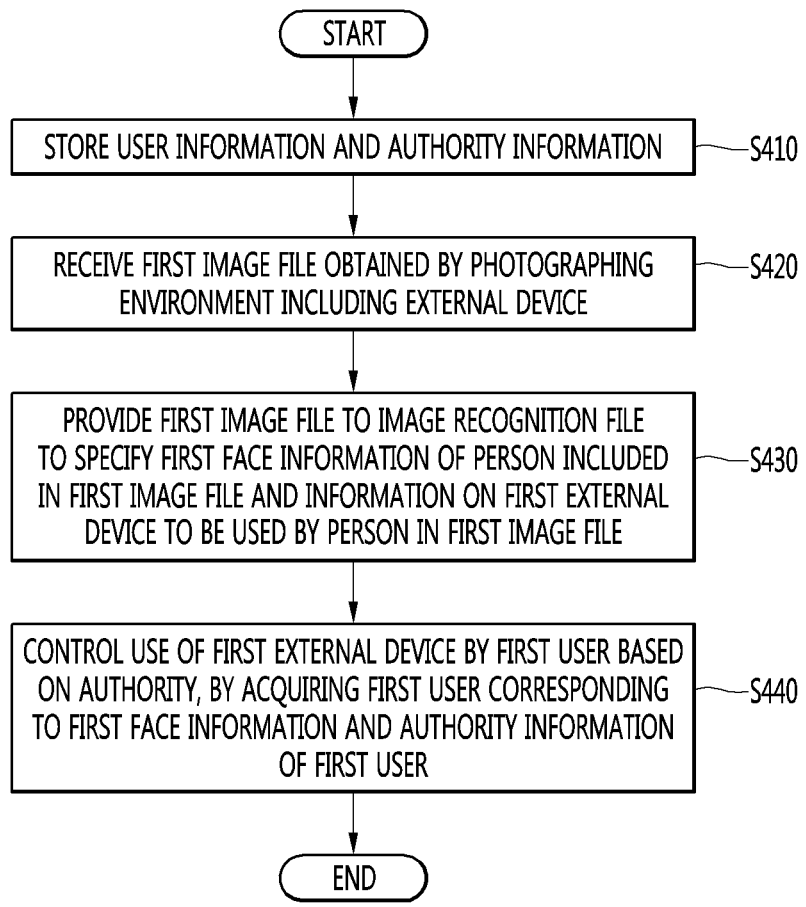
FIG. 4 is a flowchart illustrating a method of controlling authority to use an external device at an AI apparatus 100 according to an embodiment of the present disclosure.

FIG. 4 is a flowchart illustrating a method of controlling authority to use an external device at an AI apparatus 100 according to an embodiment of the present disclosure.

The external device may include a device capable of being connected to the AI apparatus 100 by wires or wirelessly, such as a TV, an air conditioner, a lamp, a washing machine, a refrigerator, a microwave oven, a cooktop, a gas stove, or the like.

The memory 170 may store information on a user registered in the AI apparatus 100 and authority information of the user (S410).

The memory 170 may store the information on the user registered in the AI apparatus 100 and the authority information indicating whether the user is capable of using at least one external device under a predetermined condition.

The user information may include information capable of identifying the user. For example, the user information may include at least one of the name of the user, the age of the user, the gender of the user or the face image of the user.

The authority information may include information on whether the user is capable of using the external device.

In addition, as the authority information, the information indicating that the user is capable of using the external device may be stored only when a specific condition is satisfied such that the user uses the external device under the predetermined condition. That is, information on the user who may use each external device may be mapped to each external device to set the authority. In addition, the authority information may include at least one of the type of the external device which may be used by the user, the type of the external device which is prohibited from being used by the user, a time when the user may use the external device or a duration when the user may use the external device.

For example, when the user is a child, the authority information may include the type "TV" of the external device which may be used by the user, the type "cooktop and gas stove" of the external device which is prohibited from being used by the user, a time "6:00 pm to 8:00 pm" when the user may use the external device or a duration "2 hours" when the user may use the external device. Accordingly, the use of the external device such as a cooktop or a gas stove except for the external device "TV" may be limited.

The predetermined condition may mean a relation between the information on the user and information on use of a specific external device. For example, the predetermined condition may include at least one of a subject who uses the external device, a time when the external device starts to be used, a duration when the external device is used, the type of the used external device, the number of users who use the external device together or the authority of a user having highest authority among the users who use the external device together.

For example, when the user is a child and the specific external device is a "TV", the predetermined condition in which the subject who uses the external device "TV" is "father, mother and child" and the number of uses who use the external device "TV" together is 3 may be set in the authority of the user. If the subject who uses the external device "TV" is "mother and child" and the number of uses who use the external device "TV" together is 2 as the condition of the current state, the predetermined condition previously set in the authority does not match the condition of the current state, the use of the external device "TV" may be limited. Accordingly, the use of the external device may be limited such that the child watches the TV together with the father and the mother.

The communication unit 110 may receive a first image file obtained by photographing an environment including at least one external device (S420).

The communication unit 110 may receive, from the external device, the image file obtained by photographing the image of the environment including the external device.

The first image file may be obtained by photographing a predetermined environment. For example, the predetermined environment may include a home environment or an office environment. The first image file may include information obtained by photographing the user located in the predetermined environment and a situation in which the user intends to use a specific external device.

In addition, the external device may include a home monitoring camera and the communication unit 110 may receive the first image file from the home monitoring camera. Meanwhile, the first image file may be an image file received via the input unit 120 or an image captured by the camera of the sensing unit 140.

The learning processor 130 may provide the first image file to an image recognition model to specify first face information of a person included in the first image file and information on a first external device to be used by the person in the first image file (S430).

The learning processor 130 may provide an image file to the image recognition model for specifying the face of a person included in the image file and an external device to be used by the person, thereby specifying the face information of the person included in the first image file and information on the external device to be used by the person in the image file.

The image recognition model may specify the face of the person included in the input image file and the external device to be used by the person.

The image recognition model may be an artificial neural network (ANN) used in machine learning. The image recognition model may be composed of artificial neurons (nodes) forming a network by synapse coupling. The image recognition model may be defined by a connection pattern between neurons of other layers, a learning process of updating a model parameter, and an activation function for generating an output value.

The image recognition model may include an input layer, an output layer, and optionally one or more hidden layers. Each layer includes one or more neurons and the artificial neural network may include a synapse connecting a neuron with a neuron. In the artificial neural network, each neuron may output a function value of an activation function for input signals, weights and bias.

The image recognition model may be generated via supervised learning, unsupervised learning or reinforcement learning according to the learning method.

For example, the image recognition model may be trained in a state of labeling training data when being generated via supervised learning. Label may mean a correct answer (or a result value) which should be inferred by an artificial neural network when training data is input to the artificial neural network.

The learning processor 130 may designate a label for specifying the face image of the user. For example, a father's face image, a mother's face image, a son's face image and the other unidentified face image may be labeled and designated.

Accordingly, the learning processor 130 may train the image recognition model to identify users by labeling the input face image when registering the user information. Accordingly, when a new image file is input, the face of the user may be identified by determining the label of the face image included in the image file.

At this time, the learning processor 130 may train the image recognition model using training data labeling the image file of each external device, in order to identify the external device in the image file.

In addition, the image recognition model may be trained via unsupervised learning for training the artificial neural network without labeling the training data or reinforcement learning for performing training such that an agent defined in a certain environment selects an action or action order for maximizing a cumulative reward in each state.

The processor 180 may control use of the first external device based on the authority, by acquiring a first user corresponding to the first face information and the authority information of the first user (S440).

The processor 180 may specify the acquired first user corresponding to the first face information based on the user information stored in the memory 170 and the authority information of the first user from the memory 170 to control the use of the first external device to be used by the first user based on the authority set with respect to the first user.

The processor 180 may search for the user information corresponding to the identified face information in the image file and control the use of the external device by the identified user based on the authority information of the searched user information.

For example, the processor 180 may compare the predetermined condition previously set in the authority of the first user with the condition of the current state and limit the use of the first external device to be used by the first user when the condition of the current state does not match the predetermined condition.

In the case where there is a plurality of pieces of first face information identified in the first image file and at least one of the first face information is identified as a registered user, when a predetermined condition previously set in the authority of at least one of a plurality of users matches the condition of the current state, even if the predetermined conditions previously set in the authorities of the remaining users do not match the condition of the current state, the processor 180 may allow the use of the first external device. That is, the processor 180 may allow the use of the external device based on a person having highest authority.

Figure 5:
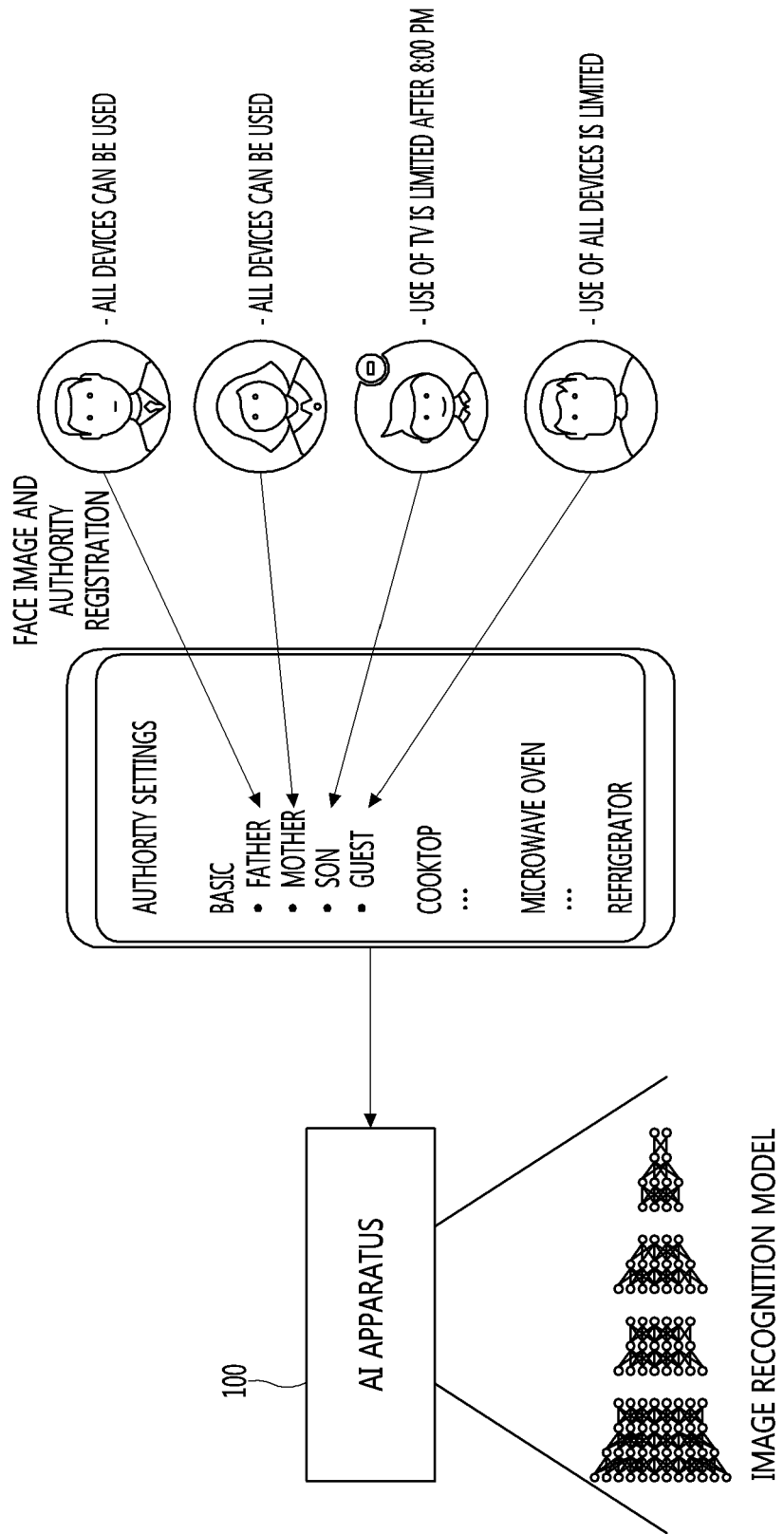
FIG. 5 is a view showing a process of registering a user and setting authority according to an embodiment of the present disclosure.

FIG. 5 is a view showing a process of registering a user and setting authority according to an embodiment of the present disclosure.

Referring to FIG. 5, the communication unit 110 of the AI apparatus 100 may receive the user information and the authority information via an external device such as a smartphone used by the user.

For example, when the AI apparatus 100 is used in a home environment, the user information of family members may be stored. The user information may include the name of the user, the age of the user, the gender of the user and the face image of the user.

For example, the memory 170 may store the registered user information of each of a father, a mother, a son or a guest and also store the face image of the father, the mother, the son or the guest.

In addition, the memory 170 may also store the authority information of an external device mapped to the user information.

The authority information may include at least one of the type of the external device which may be used by the user, a time when the user may use a predetermined external device, and a duration when the user may use the external device.

For example, the authority information may be set such that the father may always use all devices, the mother may always use all devices, the son may use a TV from 6:00 pm to 8:00 pm and the use of all devices by the guest may be always limited.

The learning processor 130 may train the image recognition model capable of identifying users based on the face image included in the registered user information.

Figure 6:
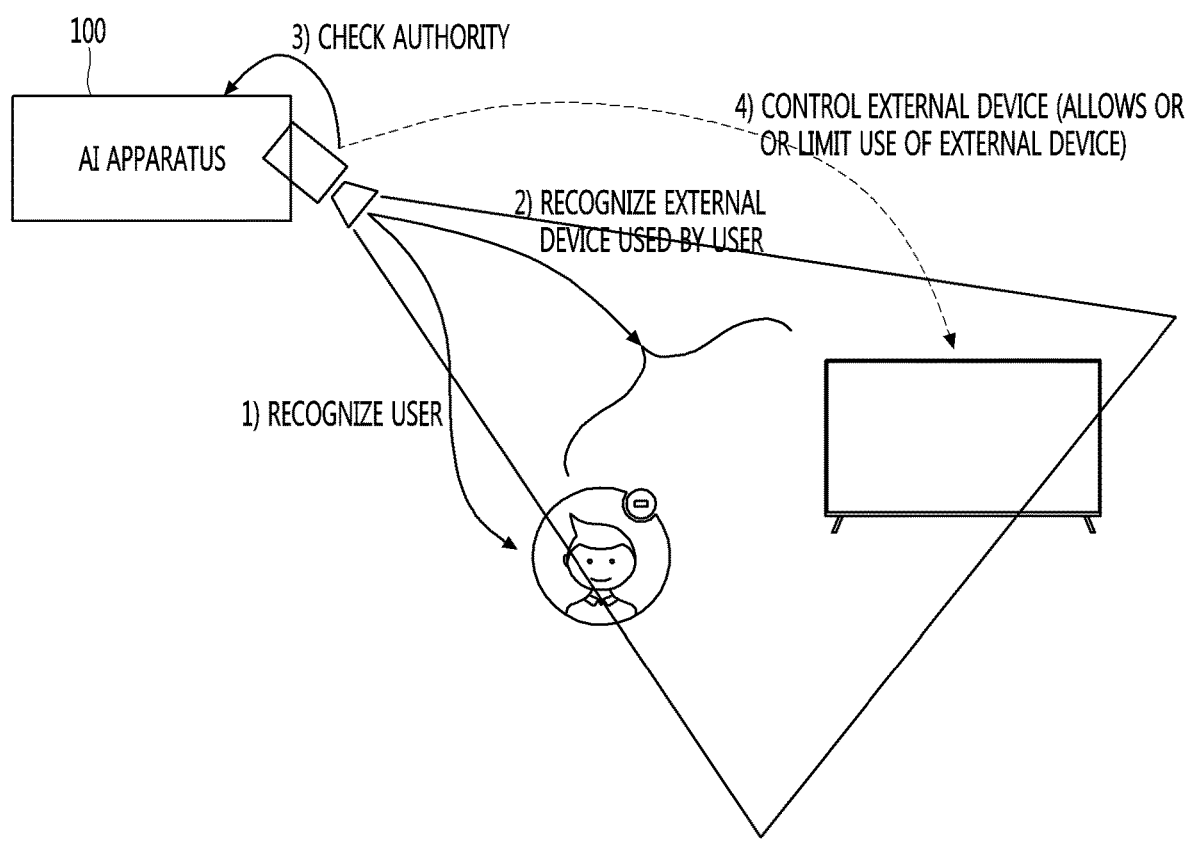
FIG. 6 is a view showing a process of controlling authority to use an external device based on user identification using image recognition according to an embodiment of the present disclosure.

FIG. 6 is a view showing a process of controlling authority to use an external device based on user identification using image recognition according to an embodiment of the present disclosure.

Referring to FIG. 6, the AI apparatus 100 may receive the first image file taken by the home monitoring camera. The first image file may be an image of an environment including at least one external device.

The learning processor 130 may specify the first face information of the person included in the first image file and information on the first external device to be used by the person in the first image file, based on the image recognition model capable of specifying the face of the person included in the image file and the external device to be used by the person.

In FIG. 6, the user may be recognized as the "son" and the external device to be used by the son may be recognized as the "TV".

The processor 180 may acquire the authority information mapped to the son, who is the user, from the memory 170. In this case, the authority information of the son for the TV may be set to the use of the TV from 6:00 pm to 8:00 pm.

The processor 180 may control the use of the TV based on the authority information of the son for the TV. For example, the processor 180 may control to keep the TV in an on state when the current time is 7:30 pm and to turn the TV off when the current time is 8:00 pm.

In addition, the processor 100 may compare the predetermined condition previously set in the authority of the son with the condition of the current state and limit the use of the first external device to be used by the first user when the condition of the current state does not match the predetermined condition.

For example, when the predetermined condition in which the subject who uses the "TV" is the "father, mother and child" and the number of users who use the "TV" together is 3 is set in the authority of the son, since the subject who uses the "TV" is "son" and the number of users who use the "TV" together is 2 as the condition of the current state, the predetermined condition set in the authority does not match the condition of the current state. Therefore, the use of the "TV" may be limited. Accordingly, the use of the TV may be limited such that the child watches the TV together with the father and the mother.

In addition, in the case where there are a plurality of users specified as the first face information and the predetermined condition previously set in the authority of at least one of the plurality of users matches the condition of the current state, the processor 180 may allow the use of the first external device even if the predetermined conditions previously set in the authorities of the remaining users do not match the condition of the current state.

For example, as the person included in the first image file, not only the "son" but also the "father" may be recognized. In addition, the external device to be used by the "father" and the "son" may be recognized as the "TV". At this time, the authority information of the father may be set such that all devices may be always used and the authority information of the son may be set such that the TV may be used from 6:00 pm to 8:00 pm. In this case, when the predetermined condition previously set in the authority of at least one of the plurality of users matches the condition of the current state, the processor 180 may allow the use of the first external device even if the predetermined condition previously set in the authority of the remaining user does not match the condition of the current state. Accordingly, even if the condition of the current state is after 8:00 pm, if the father and the son are together, the TV may be allowed to be viewed based on the authority of the father.

In addition, in the case where there are a plurality of users specified as the first face information, even if the predetermined condition previously set in the authority of at least one of the plurality of users matches the condition of the current state, when there is a user who is prohibited from using the first external device among the remaining users, the processor 180 may limit the use of the first external device.

For example, as the person included in the first image file, not only the "father" but also the "son" may be recognized. In addition, as the external device to be used by the "father" and the "son", a gas stove may be recognized. At this time, the authority information of the father may be set such that all devices may be always used and the authority information of the son may be set such that the gas stove is prohibited from being used. In this case, even if the predetermined condition previously set in the authority of at least one of the plurality of users matches the condition of the current state, when there is a user who is prohibited from using the first external device among the remaining users, the use of the first external device may be limited. Accordingly, even if the "son" tries to suddenly approach and use the gas stove while the father" is using the gas stove, it is possible to prevent danger, by limiting the use of the gas stove.

Figure 7:
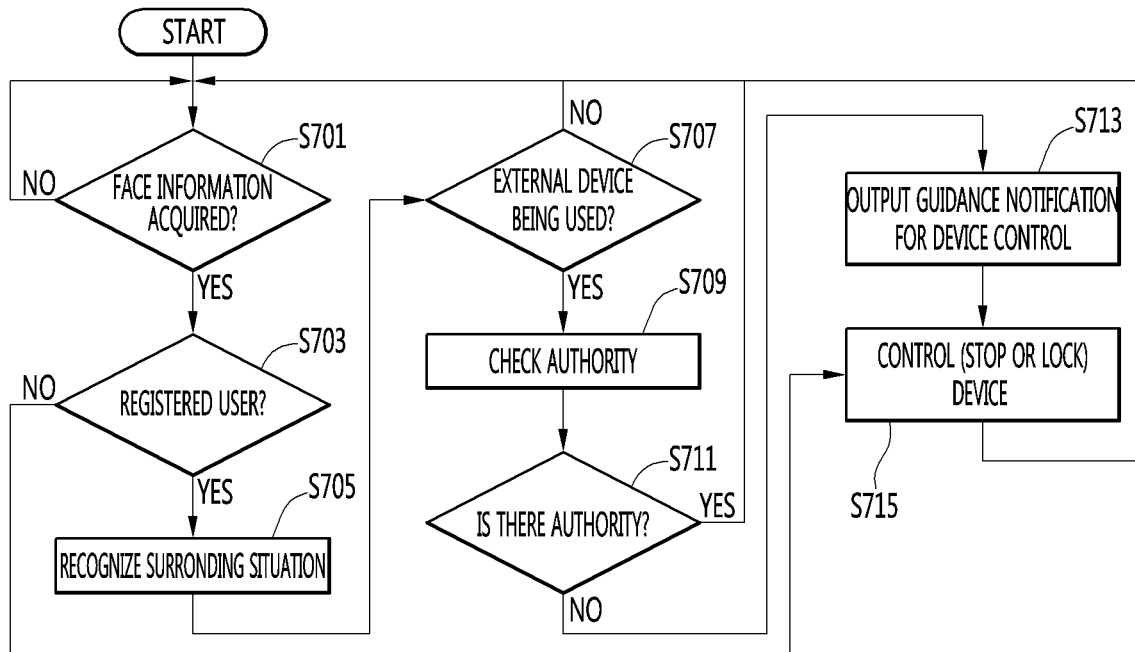
FIG. 7 is a flowchart illustrating a process of controlling authority to use an external device at an AI apparatus 100 according to an embodiment of the present disclosure.

FIG. 7 is a flowchart illustrating a process of controlling authority to use an external device at an AI apparatus 100 according to an embodiment of the present disclosure.

Referring to FIG. 7, the AI apparatus 100 may acquire the face information in the image file based on the image recognition model (S701).

When the face information is acquired, the AI apparatus 100 may search for the user information stored in the memory 170 to specify a registered user corresponding to the face information (S703). In this case, when the registered user corresponding to the face information is not searched, the device may be stopped or locked (S715). For example, in the case of a guest, the registered user corresponding to the face information may not be searched.

When the registered user corresponding to the face information is searched, the AI apparatus 100 may recognize a situation in the image file (S705). For example, the external device to be used by the user may be specified (S707).

When it is recognized that the registered user intends to use a specific external device, the AI apparatus 100 may check the authority of the user (S709).

As the result of checking the authority to use the AI apparatus 100, when the user has the authority to use the external device to be used, control may be performed such that the external device is used.

When the user does not have the authority to use the external device to be used or when the use condition does not match the current state, the AI apparatus 100 may control the external device to output a guidance notification indicating that the external device will be controlled (S713). In addition, the AI apparatus 100 may perform control to stop or lock the external device (S715).

According to various embodiments, it is possible to control an external device based on authority of a user who intends to use a specific external device located in a home environment or an office environment via an artificial intelligence apparatus capable of recognizing and learning a user and a surrounding situation.

According to the embodiment, it is possible to prevent a child from using a dangerous product, by identifying a user using image recognition, recognizing a situation and limiting use of electronic products.

The present disclosure described above can be embodied as the computer readable codes on a medium in which a program is recorded. The computer-readable medium includes all kinds of recording devices in which data that can be read by a computer system is stored. Examples of computer-readable media include hard disk drives (HDDs), solid state disks (SSDs), silicon disk drives (SDDs), ROMs, RAMs, CD-ROMs, magnetic tapes, floppy disks, optical data storage devices, and the like. In addition, the computer may also include a processor 180 of the terminal.

What is claimed is:

1. An artificial intelligence (AI) apparatus for controlling use of an external device based on user identification using image recognition, the AI apparatus comprising:
a memory configured to store user information and authority information including a predetermined condition for using an external device;
a communicator configured to receive a first image file including an external device and a first user who intends to use the external device by photographing an environment including the first user and the external device;
a learning processor configured to:
determine the first user and the external device to be used by the first user, and
provide the first image file to an image recognition model to generate face information including first face information corresponding to the first user and device information corresponding to the external device based on the first image file for identifying the external device and the first user; and
a processor configured to:
check an authority of the first user intending to use the external device based on mapping data including the user information and the authority information,
compare the predetermined condition with a condition of a current state of the authority of the first user based on the mapping data, and
control use of the external device based on the first face information and the device information generated via the image recognition model, and the user information and the authority information stored in the memory.

2. The AI apparatus of claim 1, wherein the processor is further configured to:
compare the condition of the current state of the first user and the external device with the predetermined condition included in the authority information, and
limit the use of the external device when the condition of the current state does not match the predetermined condition.

3. The AI apparatus of claim 1, wherein the processor is further configured to:
compare the condition of the current state of the first user and the external device with the predetermined condition included in the authority information, and
permit the use of the external device when the condition of the current state does not match the predetermined condition and the face information includes second face information corresponding to a second user having authority to use the external device.

4. The AI apparatus of claim 1, wherein the processor is further configured to:
compare the condition of the current state of the first user and the external device with the predetermined condition included in the authority information, and
limit the use of the external device when the condition of the current state of the first user matches the predetermined condition and the face information includes second face information corresponding to a second user prohibited to use the external device.

5. The AI apparatus of claim 1, wherein the predetermined condition includes a predetermined number of other users be present with the first user for permitting use of the external device.

6. The AI apparatus of claim 1, wherein the authority information includes at least one of a device type permitted to be used by the first user, a device type prohibited from being used by the first user, a time specifying when the first user is permitted to use the external device, or a duration specifying amount of time the first user is permitted to use the external device.

7. The AI apparatus of claim 1, wherein the authority information includes information mapping users to external devices permitted for use by the users.

8. The AI apparatus of claim 1, wherein the processor is further configured to search the user information for face information corresponding to the first face information of the first user for controlling the user of the first external device.

9. A method of controlling use of an external device at an artificial intelligence (AI) apparatus, the method comprising:
storing user information and authority information including a predetermined condition for using an external device in a memory;
receiving, via a monitoring camera, a first image file including an external device and a first user who intends to use the external device;
providing the first image file to an image recognition model;
determining, via the image recognition model, the first user to generate face information including first face information corresponding to the first user based on the first image file;
determining, via the image recognition model, the external device to be used by the first user based on the first image to generate device information corresponding to the external device;
checking an authority of the first user to use the external device based on mapping data including the user information and the authority information; and
controlling use of the external device based on a result of checking the authority of the first user.

10. The method of claim 9, further comprising:
comparing a condition of a current state of the first user and the external device with the predetermined condition included in the authority information; and
limiting the use of the external device when the condition of the current state does not match the predetermined condition.

11. The method of claim 9, further comprising:
comparing a condition of a current state of the first user and the external device with the predetermined condition included in the authority information; and
permitting the use of the external device when the condition of the current state does not match the predetermined condition and the face information includes second face information corresponding to a second user having authority to use the external device.

12. The method of claim 9, further comprising:
comparing a condition of a current state of the first user and the external device with the predetermined condition included in the authority information; and
limiting the use of the external device when the condition of the current state does not match the predetermined condition and the face information includes second face information corresponding to a second user prohibited to use the external device.

13. The method of claim 9, wherein the predetermined condition includes at least one of a subject who uses the external device, a time when the external device starts to be used, a duration when the external device is used, a type of the external device, a number of users who use the external device together, an authority of a user having a highest authority among the users who use the external device together or a predetermined number of other users be present with the first user for permitting use of the external device.

14. The method of claim 9, wherein the authority information includes at least one of a device type permitted to be used by the first user, a device type prohibited from being used by the first user, a time specifying when the first user is permitted to use the external device, or a duration specifying amount of time the first user is permitted to use the external device.

15. The method of claim 9, wherein the authority information includes information mapping users to external devices permitted for use by the users.

16. The method of claim 9, further comprising:
searching the user information for face information corresponding to the first face information of the first user for controlling the use of the first external device.

17. A method for controlling use an external device with an artificial intelligence (AI) apparatus, the method comprising:
storing registered user information and registered authority information in a memory;
receiving, via a monitoring camera, an image including at least one user and an external device to be used by the at least one user;
providing the first image file to an image recognition model to recognize the at least one user who intend to use the external device;
generating face information and device information from the first image file based on an output of the image recognition model;

comparing the face information and the device information generated from the first image file with the registered user information and the registered device information stored in the memory;

determining a specific user having a highest authority among the at least one user who intend to use the external device; and controlling use of the external device based on the specific user having the highest authority.

18. The method of claim 17, further comprising:

transmitting a control signal from the AI apparatus to the external device for prohibiting use of the external device when a user who is prohibited from using the external device among at least one user is recognized; and output a notification.

19. The method of claim 17, further comprising:

transmitting a control signal from the AI apparatus to the external device for permitting use of the external device based on the comparing when the user has authority to use the external device.

20. An artificial intelligence (AI) device for controlling use of an external device based on user identification using image recognition, the AI device comprising:

a memory configured to store registered user information and registered device information;

a monitoring camera to monitor at least one external device; and a controller configured to:

receive a first image file including at least one user and the external device to be used by the at least one user from the monitoring camera;

provide the first image file to an image recognition model to recognize the at least one user who intend to use the external device;

generate face information and device information from the first image file based on an output of the image recognition model;

compare the face information and the device information generated from the first image file with the registered user information and the registered device information stored in the memory;

determine a specific user having a highest authority and a specific user who is prohibited from using the external device among the at least one user who use the external device;

transmitting a control signal to the external device for prohibiting use of the external device when both of the specific user having the highest authority and the specific user prohibited from using the external device exist;

control use of the external device based on the control signal; and output a notification for guidance.

* * * * *